(12) United States Patent
Levesque

(10) Patent No.: US 11,754,182 B2
(45) Date of Patent: Sep. 12, 2023

(54) SYSTEM AND METHOD FOR INSTALLING SEALS ON SUPPORT FRAMES

(71) Applicant: 9320-2240 Quebec Inc., Saint-Simon-les-Mines (CA)

(72) Inventor: Rene Levesque, Saint-Simon-les-Mines (CA)

(73) Assignee: 9320-2240 QUEBEC INC., Saint-Simon-les-Mines (CA)

(*) Notice: Subject to any disclaimer, the term of this patent is extended or adjusted under 35 U.S.C. 154(b) by 770 days.

(21) Appl. No.: 16/424,326

(22) Filed: May 28, 2019

(65) Prior Publication Data
US 2019/0360588 A1 Nov. 28, 2019

Related U.S. Application Data

(60) Provisional application No. 62/677,121, filed on May 28, 2018.

(51) Int. Cl.
*B23P 19/04* (2006.01)
*F16J 15/02* (2006.01)

(52) U.S. Cl.
CPC .......... *F16J 15/022* (2013.01); *B23P 19/047* (2013.01)

(58) Field of Classification Search
CPC ...... B23P 19/047; B60J 10/45; B25B 27/0092
See application file for complete search history.

(56) References Cited

U.S. PATENT DOCUMENTS

| | | | | |
|---|---|---|---|---|
| 4,765,771 A * | 8/1988 | Howsley | ............. | E01C 23/0986 52/742.1 |
| 5,155,890 A * | 10/1992 | Goedderz | ................ | B60J 10/45 29/243.58 |
| 5,693,174 A * | 12/1997 | Nakata | .................... | B29C 48/12 156/569 |
| 6,554,040 B1 * | 4/2003 | Cueff | .................... | B23P 19/047 29/235 |
| 2007/0193016 A1 * | 8/2007 | Kondo | ..................... | B60J 10/45 29/559 |
| 2009/0260211 A1 * | 10/2009 | Komatsu | ................. | B60R 13/06 29/700 |
| 2010/0024976 A1 * | 2/2010 | Grohmann | ............ | B23P 19/047 156/367 |
| 2011/0308054 A1 * | 12/2011 | Bednarz | ................ | B23P 19/047 29/235 |
| 2018/0120171 A1 * | 5/2018 | Bauer | ........................ | G01L 1/04 |
| 2022/0016963 A1 * | 1/2022 | Ruhland | .................. | B60J 10/45 |

* cited by examiner

*Primary Examiner* — Rick K Chang
(74) *Attorney, Agent, or Firm* — Brouillette Legal Inc.; Robert Brouillette

(57) ABSTRACT

The present invention is directed to a system and method for installing seals on support frames. The system comprises, generally, a seal supply system, a guiding mechanism and a sealing mechanism. The supply system comprises two bobbins around which are disposed the sealing elements. The guiding mechanism comprises a plurality of guiding drive wheels adapted to guide the support frames towards the sealing mechanism which is adapted to seal the sealing element to the support frame. The sealing mechanism is adapted to exert continuously a constant pressure on the sealing element allowing it to fit to the correspondent support frame once being introduced to the sealing mechanism.

10 Claims, 10 Drawing Sheets

SYSTEM AND METHOD FOR INSTALLING SEALS ON SUPPORT FRAMES

CROSS-REFERENCE TO RELATED APPLICATIONS

The present patent application claims the benefits of priority of U.S. Provisional Patent Application No. 62/677,121, entitled "SYSTEM AND METHOD FOR INSTALLING SEALS ON SUPPORT FRAMES", and filed at the United States Patent and Trademark Office on May 28, 2018, the content of which is incorporated herein by reference.

FIELD OF THE INVENTION

The present invention generally relates to systems and mechanisms for inserting and sealing strips into grooves. More particularly, the present invention relates to a system and a method for installing seals on support frames of windows.

BACKGROUND OF THE INVENTION

Conventionally, the process of inserting sealing strips into grooves of support frames was hand-operated and performed by a team of operators in order to make such a process as fast as possible depending on the area of the support frames to be sealed. Such a process substantially relies on the skill of the operator, good visibility and a thorough examination of the sealed support frames in order to ensure the required adhesion between the support frames and the main structure. Thus, an automatic system and method for installing seals on support frames is highly desirable to avoid at least some technical imperfections resulting from hand-operated process. Indeed, in some fields, such as the automotive field or the aviation field, imperfections may result in dramatic and/or disastrous effects.

Nowadays, many systems and mechanisms for inserting sealing strips into grooves of support frames have been proposed to allow automatic insertion of seals on support frames, such as systems disclosed in German patents No. 3,203,448 and No. 2,915,282. The said systems allow installation of the sealing element by synchronizing the movement of the sealing element and the movement of the work piece. The systems further apply pressure using rollers to allow instant application of the sealing element over the surface of the workpiece. However, such process is generally inconvenient as some sealing elements tend to shrink or even get detached once being installed on workpieces.

Thus, there is still a need for an improved system and method for installing seals on support frames which tend to mitigate the shortcomings of the prior art systems and methods.

SUMMARY OF THE INVENTION

The shortcomings of the prior art are generally mitigated by providing a system and method for installing seals on support frames allowing to improve the adhesion between the sealing elements and the support structure.

In one aspect of the invention, the present system aims at providing an automatic system and method for installing seals on support frames in a way to avoid any technical imperfections related to a hand-operated process.

In another aspect of the invention, the present system aims at avoiding or at least limiting the shrinking effect on the sealing elements on installed. The system may further aim at avoiding or at least limiting the detachment of installed seal elements from workpieces as the sealing system is adapted to maintain the sealing elements under a constant pressure.

In yet another aspect of the invention, a system for installing a resilient sealing element a support frame is provided. The system comprises a sealing mechanism comprising the drive mechanism being adapted to tractionally engage with the sealing element and to move the sealing element at a first speed, a compacting mechanism adapted to apply a constant pressure over the sealing element being moved by the drive mechanism for deforming the sealing element prior to being fitted on the support frame and a fitting mechanism adapted to fit the compacted sealing element on the support frame being moved. The system further comprises a supply mechanism adapted to move the support frame at second speed to the fitting mechanism, wherein the first speed is higher than the second speed.

The sealing mechanism may further comprise a supporting base, the drive mechanism, compacting mechanism and the fitting mechanism being mounted to the supporting base. The compacting mechanism may comprise at least one pressing idling wheel pivotally mounted to the supporting base, being adapted to apply constant pressure on a side of the sealing element.

The sealing mechanism may further comprise a sealing element engaging mechanism yet disengaging mechanism. The engaging mechanism may be pivotally mounted to the system, the engaging mechanism being pivotable in an engaging position to enable movement of the sealing element and in a disengaged position to stop movement of the sealing element. The engaging mechanism may comprise an idling wheel adapted to engage the sealing element against the drive mechanism.

The system may further comprise an actuator for pivoting the engaging mechanism.

The supporting base may further comprise supporting arms, each supporting arm comprising a fitting mechanism and a compacting mechanism, wherein each supporting arm is adapted to compact a sealing element. The system may further comprise a controller adapted to vary the first speed. The system may further comprise one or more sensors configured to detect presence of the support frame, the sensor being connected to the controller. The controller may further be configured to activate the driving mechanism when the frame support is detected and to deactivate the driving mechanism when the support frame is not present.

The ratio of the first speed on the second speed may range between 1.01 and 1.05.

The system may further comprise a cutting system, the cutting system being configured to cut the sealing element when an extremity of the frame support is detected.

In a further aspect of the invention, a method for installing a resilient sealing element on a support frame is provided. The method comprises moving the sealing element toward the support frame at a first speed, moving the support frame at a second speed toward a sealing mechanism, the second speed being slower than the first speed, applying a constant pressure on the moving sealing element, the pressure being strong enough to at least partially deform the sealing element and fitting the moving sealing element on the moving supporting frame.

The method may further comprise activating movement of the sealing element to synchronize with movement of the supporting frame and deactivating movement of the sealing element when no supporting frame is present. The activating of movement of the sealing element may further comprise pivoting an engaging member to enable traction of the sealing element. The ratio of the first speed on the second speed may range between 1.01 and 1.05.

In another aspect of the invention, a method for installation of a sealing mechanism on a system for installing a resilient sealing element on a frame support is provided, the sealing mechanism comprising a driving mechanism to be mounted on a drive shaft. The method further comprises providing a sealing mechanism slid on a storing shaft, mounting the storing shaft to one end of the drive shaft, sliding the sealing mechanism to be completely supported by the drive shaft, mounting the sealing mechanism on the drive shaft and unmounting the storing shaft from the drive shaft.

The method may further comprise removing the sealing mechanism from the driving shaft. The method further comprising mounting the storing shaft to one end of the drive shaft sliding the sealing mechanism to be completely supported by the storing shaft and unmounting the storing shaft from the drive shaft now supporting the sealing.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel system and method for installing seals on support frames will be described hereinafter. Although the invention is described in terms of specific illustrative embodiments, it is to be understood that the embodiments described herein are by way of example only and that the scope of the invention is not intended to be limited thereby.

Figure 1:
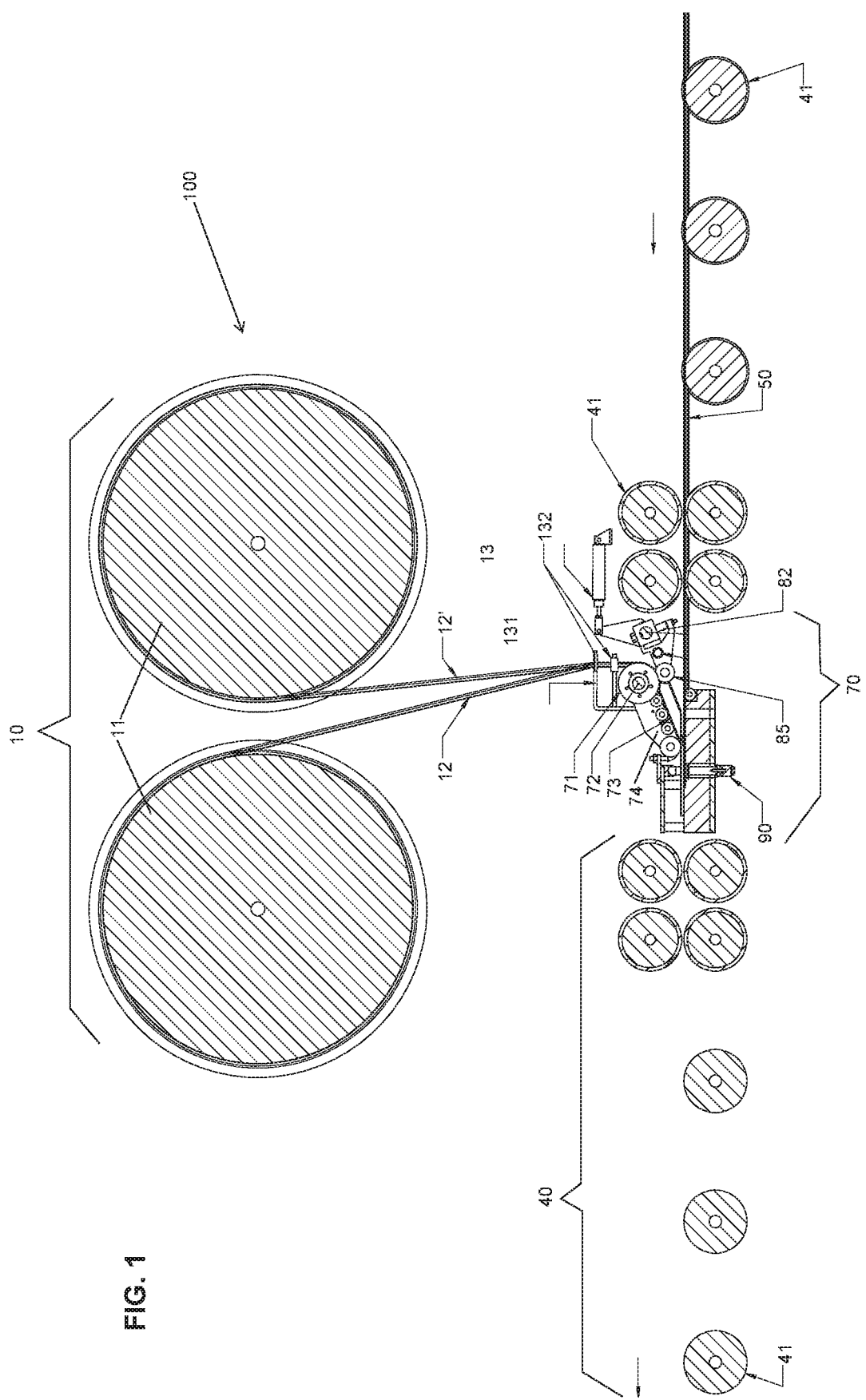
FIG. 1 is a sectional side view of a system for installing seals on support frames in accordance with the principles of the present invention.

Referring to FIG. 1, a preferred embodiment of a system 100 for installing seals on support frames is illustrated. The system 100 generally comprises, a seal supply system 10, a mechanism for guiding support frames 40 and a sealing mechanism 70.

In a preferred embodiment, a first sealing element 12 is supplied and installed on one side of the support frame 50 and a second sealing element 12' is simultaneously supplied and installed on the other side of the support frame 50. In such embodiment, the supply system 10 comprises two rolls or wheels 11 around which the sealing elements 12, 12' are disposed or enrolled. In a preferred embodiment, the rolls 11 are adapted to be installed above the guiding and sealing mechanisms 40 and 70.

In a typical embodiment, the first resilient sealing element 12 and the second resilient sealing elements 12' are of the same type but installed in reversed order.

Thus, each roll 11 may further be configured to automatically rotate in opposite direction, such as one roll being rotated in the clockwise direction and the other being rotated in the counter clockwise direction.

As explained above, such opposite directions generally aim at supplying the sealing elements 12, 12' in the right position to be simultaneously installed on either side of the support frame 50.

As some of the manufacturers of sealing elements 12, 12' enroll the sealing elements 12, 12' in a unique direction on the roll 11, one of sealing element 12 must reversed or re-enroll in the other direction prior to supplying the system 100. In such embodiments, the system 100 further comprises a sealing element inversion mean or sealing element inverter (not shown). The inversion mean is adapted to invert one of the sealing elements 12 prior to be installed on the support frames 50.

Understandably, any other supply system 10 known in the art or to be developed to simultaneously supply sealing elements 12, 12' to the sealing mechanism 70 may be used without departing from the scope of the present invention.

The supply mechanism 10 may further comprise at least one guiding and/or positioning member 13 being configured to properly guide the sealing elements 12 towards the sealing mechanism 70. In a preferred embodiment, the guiding member 13 comprises a macro guiding member 131 and a micro guiding member 132. The macro guiding member 131 is typically embodied as an aperture, such as a circular aperture, made of a rigid material. The macro guiding member 131 generally maintain the alignment of the sealing element 12, 12' toward the sealing mechanism 70. The micro guiding member 132 generally aims at precisely guide the sealing element 12, 12' toward the drive wheel 71.

Figure 2:
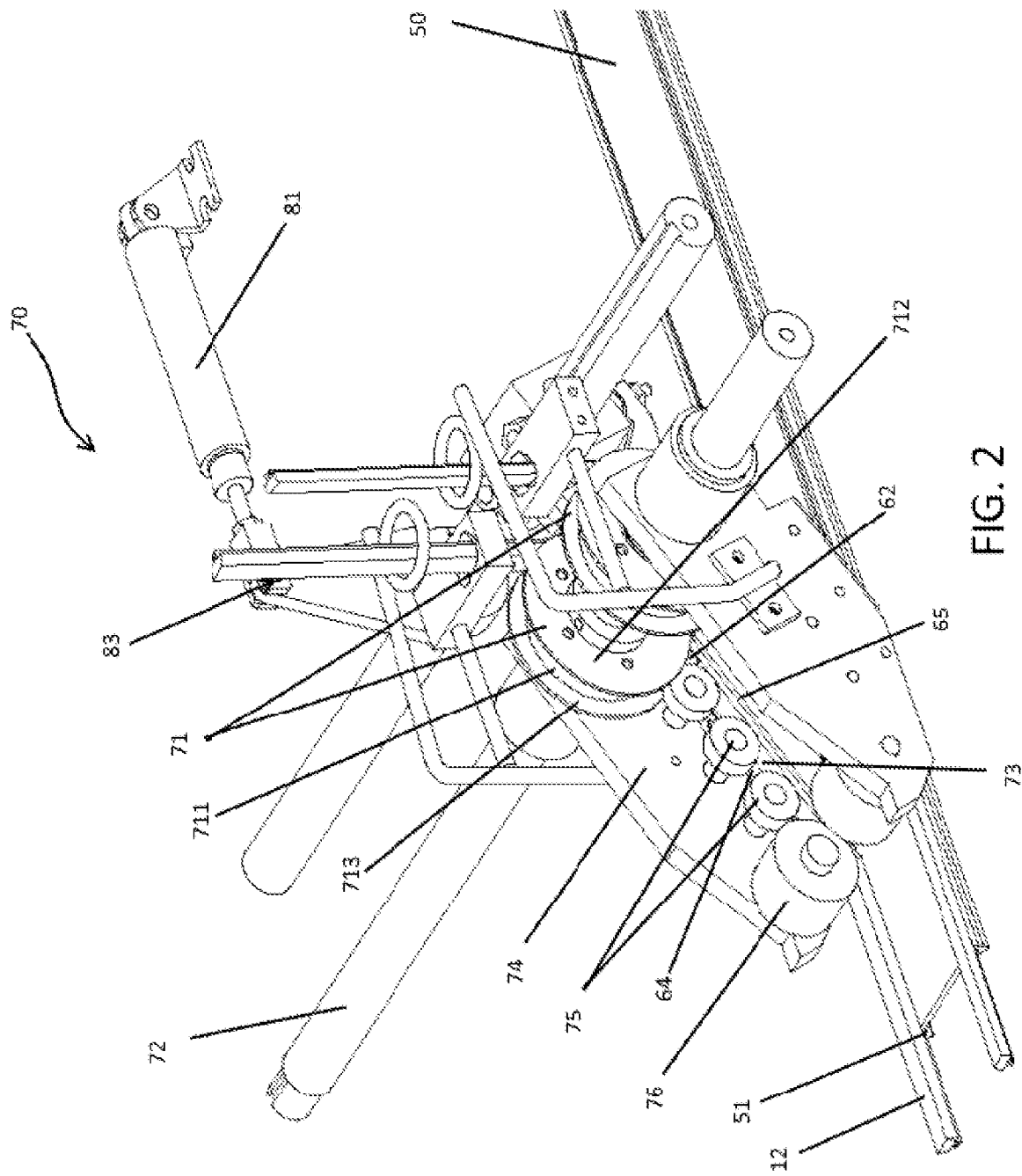
FIG. 2 is a perspective view of a sealing mechanism for installing seals on support frames in accordance with the principles of the present invention.

Now referring to FIG. 2, an example of a macro guiding member 131 made of metal rod shaped as a circular aperture is shown. In a preferred embodiment, the micro guiding member 132 is made of a rigid yet malleable portion 134. The rigid portion 134 comprises an aperture 133 generally shaped to match the shape of the sealing element 12, 12' being used.

Referring back to FIG. 1, the guiding mechanism 40 typically comprises a plurality of guiding drive wheels 41 adapted to guide and move the support frames 50 towards the sealing mechanism 70 or outside the sealing mechanism 70. In one embodiment, the guiding drive wheels 41 are preferably disposed in two parallel underside rows in order to guide the support frames 50 inside and outside the system 100. In another embodiment, the guiding drive wheels 41 may be further disposed in two parallel topside rows upstream and downstream of the sealing mechanism 70, aiming at maintaining the position of the support frames 50 as straight as possible prior and after the reception of the sealing elements 12. Understandably, in other embodiments, any other type of known guiding mechanism 40 may be used without departing from the scope of the present invention. Furthermore, in some other embodiments, the guiding mechanism could be omitted and an operator could manually feed the support frame 50 to the system 100 and/or another operator may receive the support frame 50 being push out of the system 100.

Figure 3:
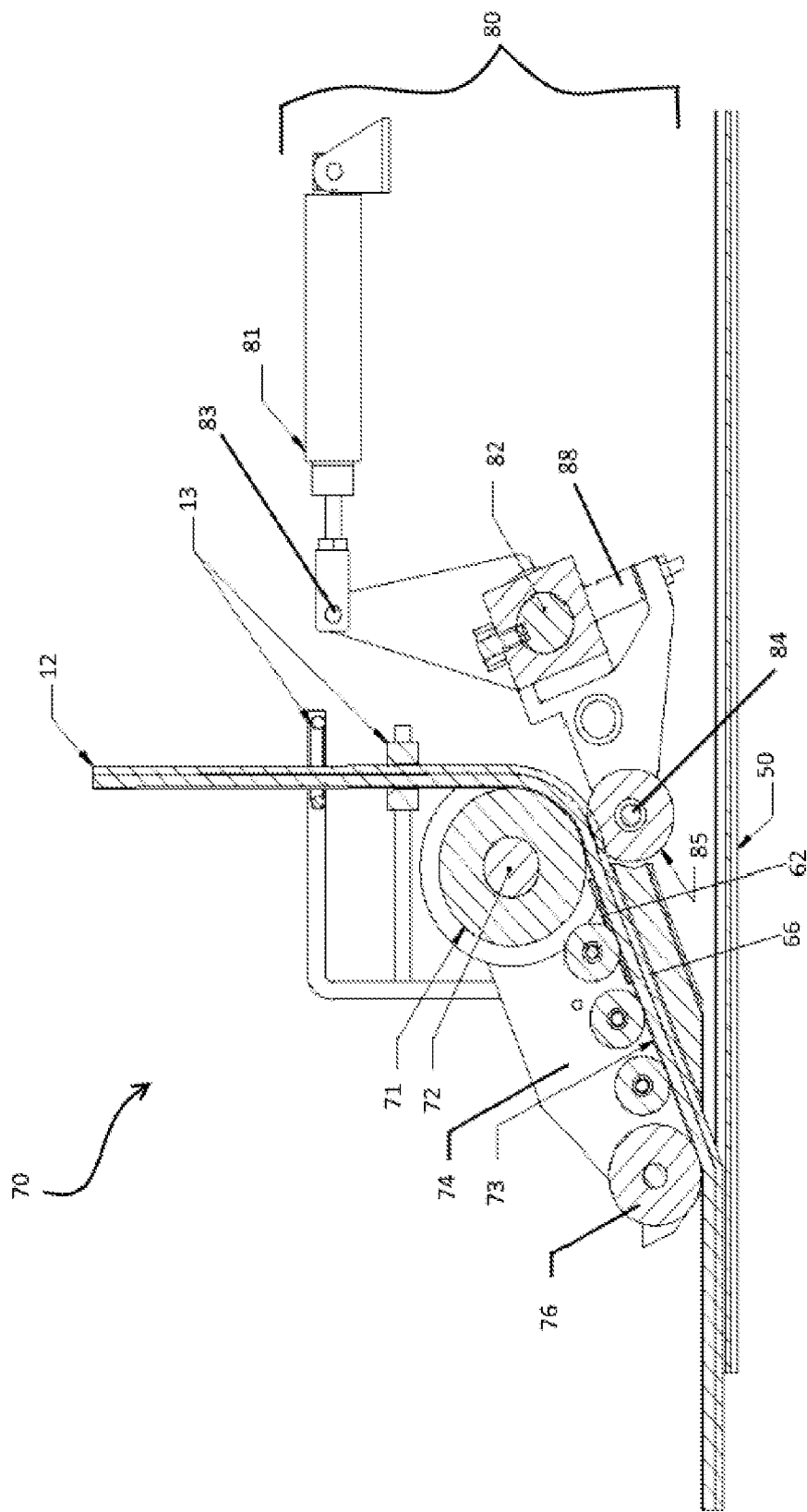
FIG. 3 is a sectional side view of the sealing mechanism of FIG. 2.
Figure 4:
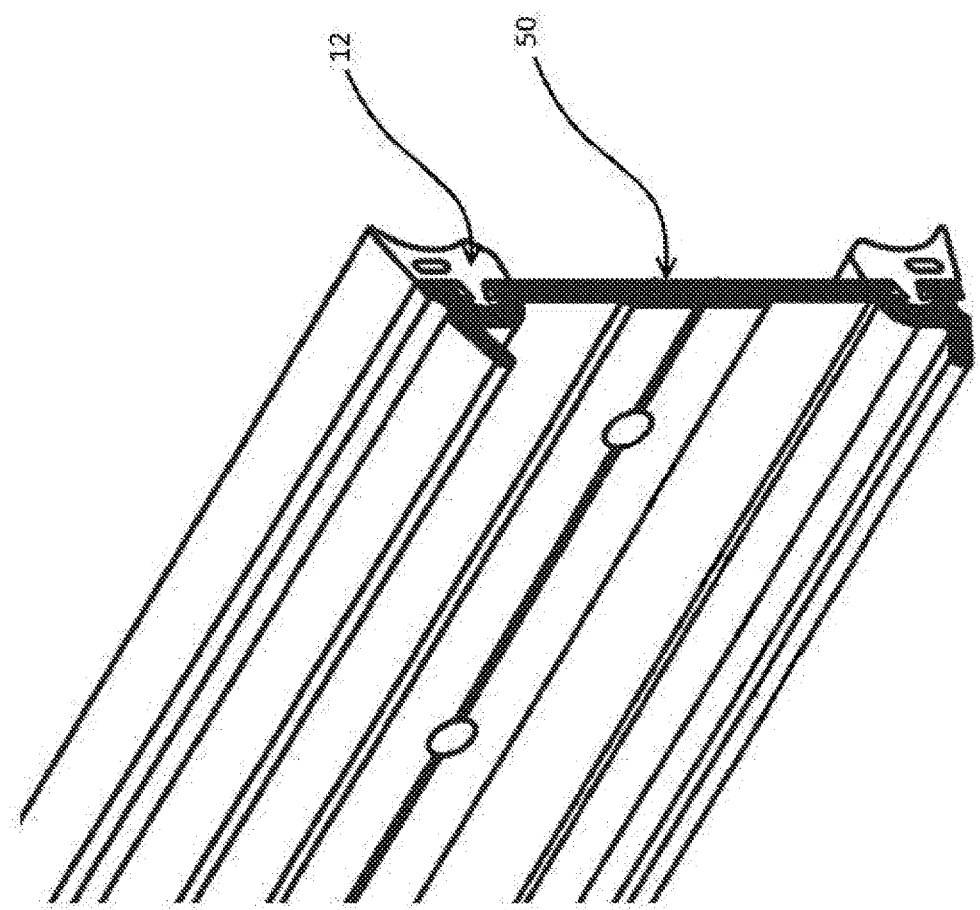
FIG. 4 is a perspective view of an exemplary support frame comprising a sealed gasket installed using a system for installing seals in accordance with the principles of the present invention.
Figure 5:
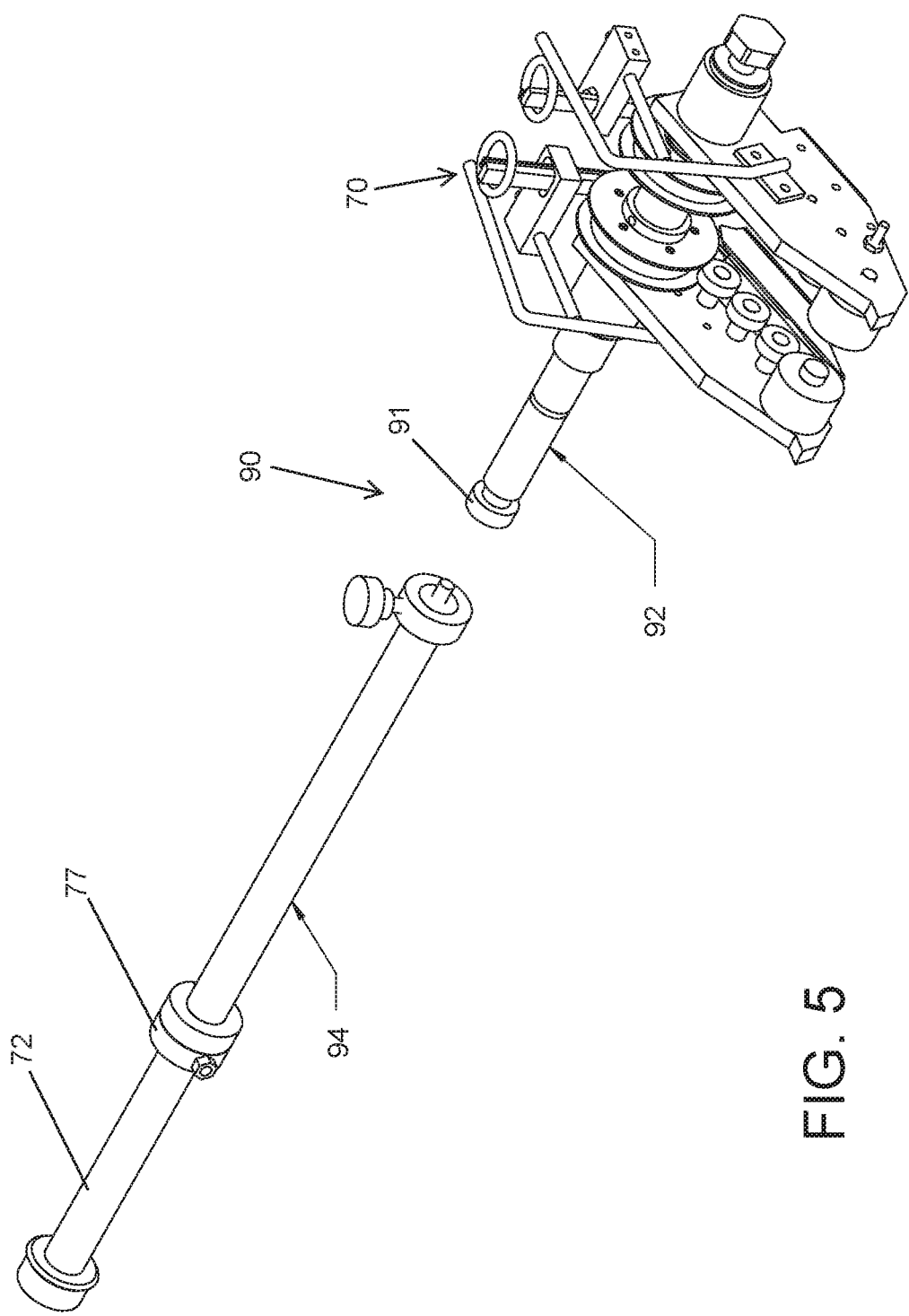
FIG. 5 is a perspective view of the sealing mechanism of FIG. 2 shown prior to installation on an embodiment of a replacement mechanism prior to be connected to the drive shaft.
Figure 6:
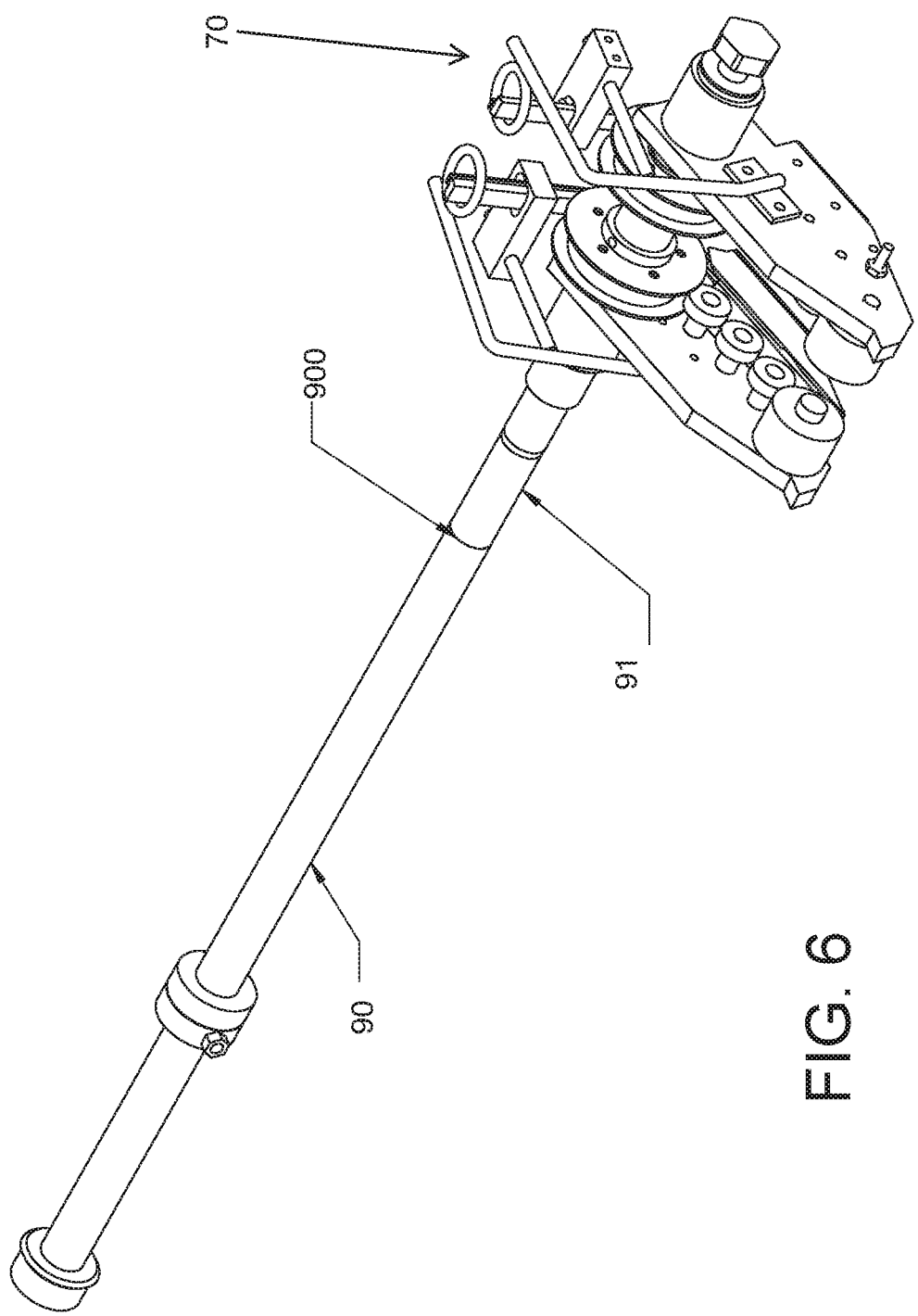
FIG. 6 is a perspective view of the sealing mechanism of FIG. 2 shown prior to installation using an embodiment of replacement mechanism of FIG. 5.

Referring now to FIGS. 1-3, a preferred embodiment of a sealing mechanism 70 is illustrated. The sealing mechanism 70 typically comprises two drive wheels 71 rotatably mounted to a driving shaft 72 forming a driving mechanism or system, a compactor module 73. In other embodiment, the sealing mechanism 70 may comprise more than two drive wheels 71 or a unique drive wheels 71 if only one sealing element 12 must be installed on the support frame 50. The drive wheel 71 typically comprises a surface 711 adapted to receive the sealing member 12. The surface may comprise friction elements or uneven surface to provide improved traction to the sealing element 12.

The driving mechanism is adapted to move or tract the sealing member 12 toward the compacting system 73 and the fitting system 76.

The drive wheels 71 are preferably configured to receive and to drive the sealing elements 12 towards a compactor module 73. In a preferred embodiment, the compactor module 73 is located over support arms 74.

The support arms 74 are rotatably mounted to the driving shaft 72 and comprise a plurality of guiding pressing wheels 75 and at least one compacting wheel 76. The guiding pressing wheels 75 are configured to guide the sealing element 12 over the compactor module 73 while maintaining the sealing element 12 under a desired pressure.

Still referring to FIGS. 1-3, the sealing mechanism 70 further comprises a pressure maintaining mechanism or drive engaging mechanism 80. In some embodiments, the engaging mechanism 80 comprises a cylinder 81 connected to one extremity 83 of a pivoting tensioning arm 82. At another extremity 84, the pivoting tensioning arm 82 comprises a pressing wheel or idling wheel 85 adapted to exert a pressure or at least friction on the sealing element 12. In such a configuration, once introduced to the sealing mechanism 70, a constant pressure is applied to the sealing element 12 while the sealing element 12 is being guided between the drive wheels 71 and an engaging wheel 85.

In some embodiments, the tensioning arm 82 comprises at least one resilient tensioning member 88 configured to adjust the pressure applied by the tensioning arm 82 of the engaging mechanism 80 on the sealing element 12 (See FIG. 3).

Understandably, the constant pressure applied by the compacting mechanism 73 on the sealing element 12 aims at compacting the sealing element 12 and is adapted to engage the grooved surface of the support frame 50.

Understandably, the constant pressure applied by the compacting mechanism 73 on the sealing element 12 generally aims at avoiding sealing elements to get shrink or even to get detached while being installed or after being installed on workpieces.

Still referring to FIGS. 1-3, the support arms 74 and the pivoting tensioning arm 82 are adapted to upwardly pivot around an axis, such as the driving shaft 72 or parallel to the driving shaft 72. The support arms 74 are preferably pivoted around the driving shaft 72 after introducing a support frame 50 in the sealing mechanism 70. Such pivoting movement generally allows passage of the support frame 50 under the support arms 74 distributing the sealing element 12 and applying pression on the sealing element 12. In a preferred embodiment, the fitting or pressure wheel 76 aims at fitting the sealing element 12 into a corresponding groove 51 of the support frame 50. The support arms 74 are adapted to downwardly pivot around the driving shaft 72 once the support frame 50 comprising the sealing element 12 exits from the sealing mechanism 70.

Understandably, as the resilient sealing element 12 is compressed, the resiliency properties of the sealing element 12 tend to stretch the sealing element 12. Thus, in a preferred embodiment, the speed at which the sealing element 12 is moved shall be higher than the speed at which the support frame 50 is moved to ensure that enough sealing element 12 material is fitted in the support frame 50, such as fitted into grooves of the support frame 50. In some embodiment, the ratio between the speed of the sealing element and the speed of the support frame 50 may vary between 1.01 and 1.05.

In a preferred embodiment, the system 100 further comprises sensors adapted to detect the presence of a support frame 50 and to detect the starting end and/or the other end of the support frame 50 over the guiding wheels 50.

In a preferred embodiment, the system 100 further comprises operating components adapted such as a controller configured to initiate and synchronize the operations of the supply system 10, the guiding mechanism 40 and the sealing mechanism 70.

The controller may further be configured to control the engaging mechanism 80, typically by sending a control signal to the actuator 81. The controller may further be configured to vary the speed of the driving mechanism 71.

Referring now to FIGS. 5 to 8, an embodiment of a sealing mechanism 70 shown prior to be installed on the driving shaft 72 is shown. In some embodiments, one may need to replace the sealing mechanism in order to adapt to different models and specification of the sealing element 12, 12'. In such embodiments, an installation mechanism or means 90 generally aims at reducing time of installation of the sealing mechanism 70. The installation mechanism generally comprises an elongated member shaped to be received by the one or more drive wheels 71 of the sealing mechanism 70.

In embodiments where the one or more drive wheels 72 are adapted to be driven by a drive shaft 72, the installation mechanism 90 comprises a storing shaft 92 similarly shaped to the drive shaft 71. The sealing mechanism 70 is slid on the storing shaft 92 through aperture within drive wheels 72. In such embodiment, the drive shaft 72 comprises an attachment portion or means 77 adapted to attach or connect to a corresponding attachment portion 91 of the storing shaft 92. Understandably, any type of known attachment or connecting mechanism may be used to attach or connect the drive shaft 72 to the storing shaft 92 resulting in the two attached shafts 72 and 91 providing a continuous periphery allowing sliding of the sealing mechanism 70 from the storing shaft 92 to the drive shaft 72.

In some further embodiments, the installation mechanism 90 may further comprise an extension member or shaft 94. The extension member 94 is adapted to attach at one end to the attachment portion 77 of the drive shaft 72 and at another end to the attachment portion 91 of the storing shaft 92.

Still referring to FIGS. 5 to 8, a method for installation, removal or replacement of a sealing mechanism 70 with another sealing mechanism 70 is illustrated. The method for installation generally comprises providing a sealing mechanism 70 on a storing shaft 92 and attaching or connecting the storing shaft 92 to one end of the drive shaft 72 or of the extension member 94. The method further comprises sliding the sealing mechanism 70 toward the driving shaft 72 or the extension 94 to be completely supported by the said driving shaft 72 or extension member 94. The method further comprises detaching the storing shaft 92 from the drive shaft 72 or extension member 94. The sealing mechanism may then be tightened on the drive shaft 72 to be used on the system.

The method for removal of a sealing mechanism 70 generally comprises attaching the storing shaft 92 without a sealing mechanism 70 to one end of the drive shaft 72 or of the extension member 94. The method further comprises sliding the sealing mechanism 70 toward the storing shaft 92 to be completely supported by the said storing shaft 92. The method further comprises detaching the storing shaft 92 now supporting the sealing mechanism 70 from the drive shaft 72 or extension member 94. The sealing mechanism 70 may then be stored or moved elsewhere.

The method for replacement generally comprises removing the sealing mechanism 70 as described above followed by the installation of another sealing mechanism 70 following the method described above.

Figure 9:
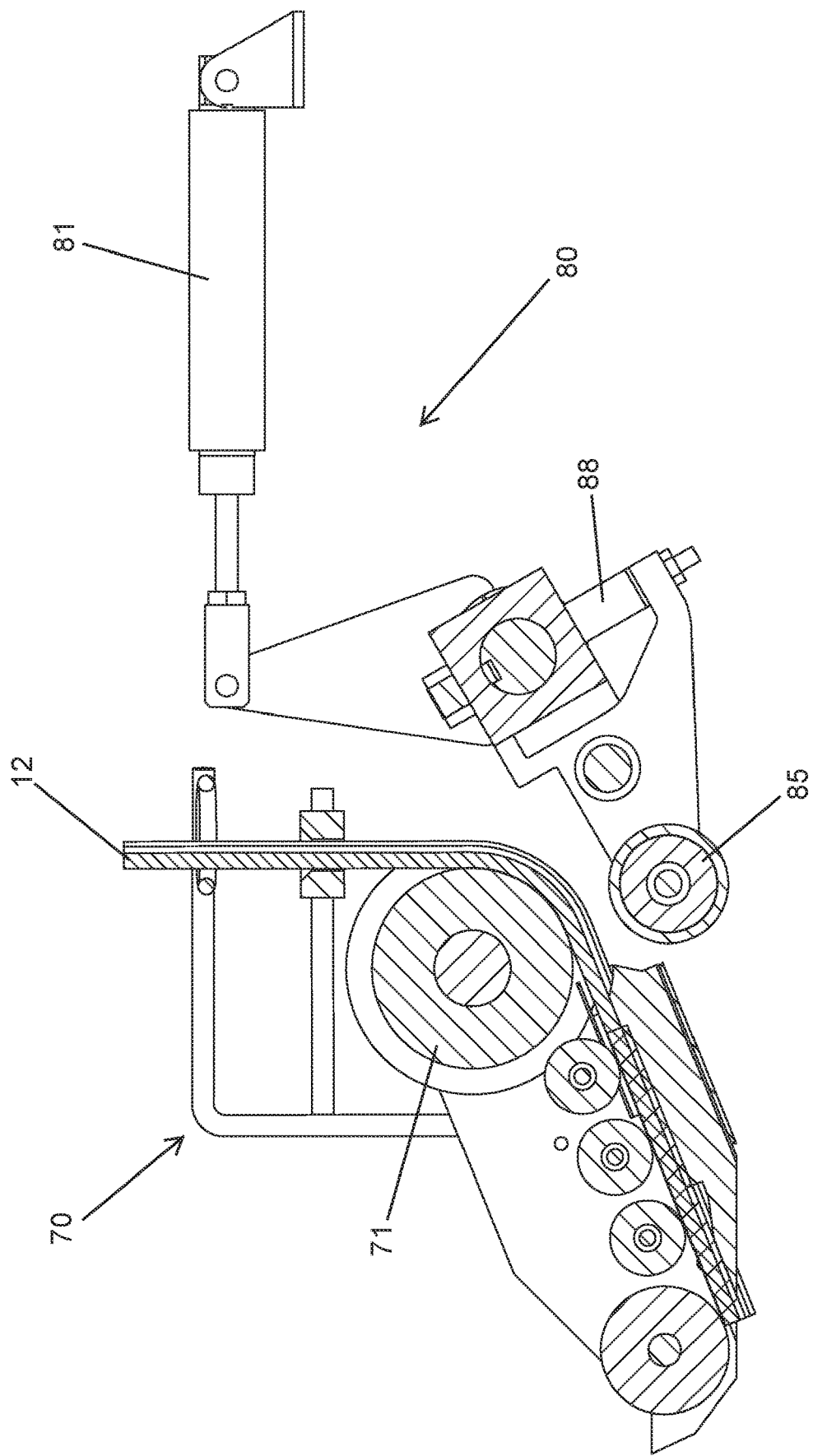
FIG. 9 is a sectional side view of the sealing mechanism shown with the pressure maintaining mechanism being disengaged.
Figure 10:
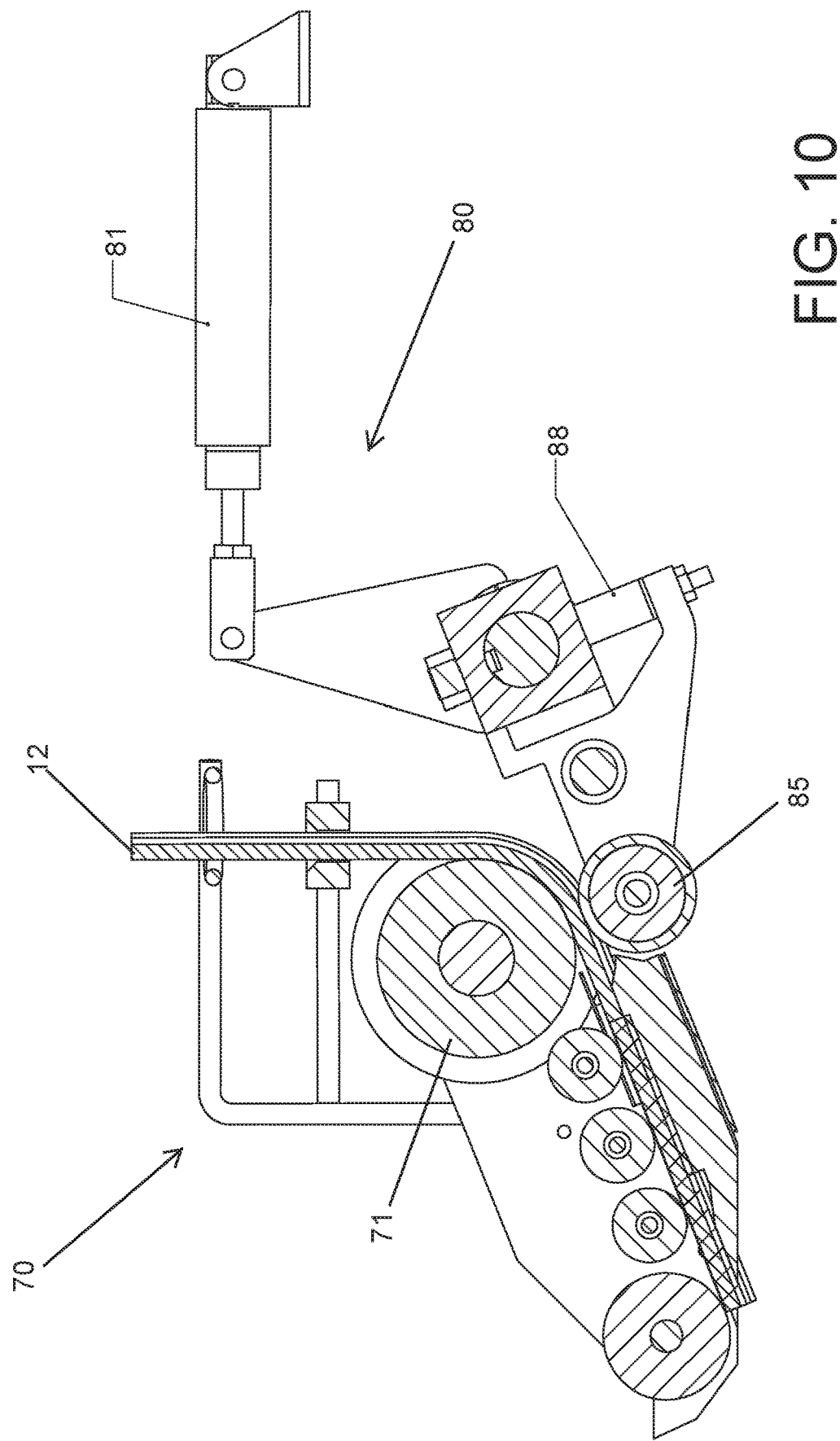
FIG. 10 is a sectional side view of the sealing mechanism of FIG. 8 shown with the pressure maintaining mechanism being engaged.

Referring now to FIGS. 9 and 10, the sealing mechanism 70 is shown is a disengaged configuration (FIG. 9) and in an engaged configuration (FIG. 10). As shown, the engagement mechanism 80 may engage and disengage with the sealing mechanism 70. In a disengaged configuration, the sealing elements 12 and 12' are free to be driven by the drive wheel 71 without any applied pressure. In an engaged configuration, the actuator 81 is activated to move or pivot the pressure idling wheel 85 on the sealing elements 12 and 12'. As explained above, the resilient tensioning member 88 provides a way to adjust the tension on sealing element 12 or 12'.

In a preferred embodiment, the system for installing seals on support frames comprises a controller (not shown) adapted to control the activation of the actuator 81. The controller may be configured to alternate between engaged and disengaged configurations based on the type of sealing element 12, 12', the speed of installation, the type of elastomeric material of the sealing element, the shape of the sealing element or any other relevant parameter. Typically, the system is configured to alternate between the engaged and disengaged configuration at predetermined times or following a predetermined sequence. Understandably, the controller may be programmed or configured to a adapt to any sequence or specific application.

Referring now to FIGS. 1-4, a method for installing seals on support frames is illustrated. The method for installing seals on support frames 50 comprises moving a support frame 50 under a sealing mechanism, feeding seals to the sealing mechanism, applying a continuous and constant pressure on the sealing elements 12 within the sealing mechanism prior to applying the seal to the support frame 50, maintaining the continuous and constant pressure on the seal while the seal is applied on the moving support frames 50.

In a preferred embodiment, the method comprises introducing a support frame 50 to the installing system 100 and activating the guiding wheels 41 in order to guide the support frame 50 towards the sealing mechanism 70. The method further comprises detecting the presence of the support frame 50, preferably close to the sealing mechanism 70. The method may further comprise automatically activating the supply mechanism 10 upon entrance of the support frame 50. The method further comprises activating the rotation of the drive wheels 71 to receive and to drive the sealing elements 12 towards the compacting section 73. The compacting section 73 is preferably located over the support arms 74. Once moved by the drive wheels 71, a compacting mechanism 73 applies pressure on the sealing elements 12 fitted on the support structure 50. Such pressure generally aims at keeping compact the sealing element 12 and adapted to engage a grooved surface. In this embodiment, the sealing element is compacted and deformed between the drive wheel 71 and the pressing wheel 85 while being driven. The compaction creates a first pressure point.The deformation of the sealing element is maintained by the guiding pressing wheels 75 pressing the against the plate 79. The scaling element is also guided by the scaling mechanism. The fitting wheel 76 applied pressure on the sealing element against the support frame 50 to fit the sealing element on the said support frame, thus creating a second pressure point. As the speed of the sealing element relative to the sealing mechanism is faster than the speed of the support frame relative to the sealing mechanism, a lengthwise compression is created between the two pressure points. As such the step to guide and maintain the sealing element under a constant pressure between the two pressure points aims at avoiding any distortion that may be created on the sealing element.

The method further comprises upwardly pivoting the support arm 74. Such pivoting generally allows the support frame 50 to pass under the support arm 74 for the compacting wheel 76 to fit the sealing element 12 into corresponding grooves 51 of the support frame 50. The method further comprises detecting the end of the sealing operation and activating the cutting system 90 (See FIG. 1) in order to cut the sealing element 12 being installed on the support frame 50 at the predetermined length.

Figure 7:
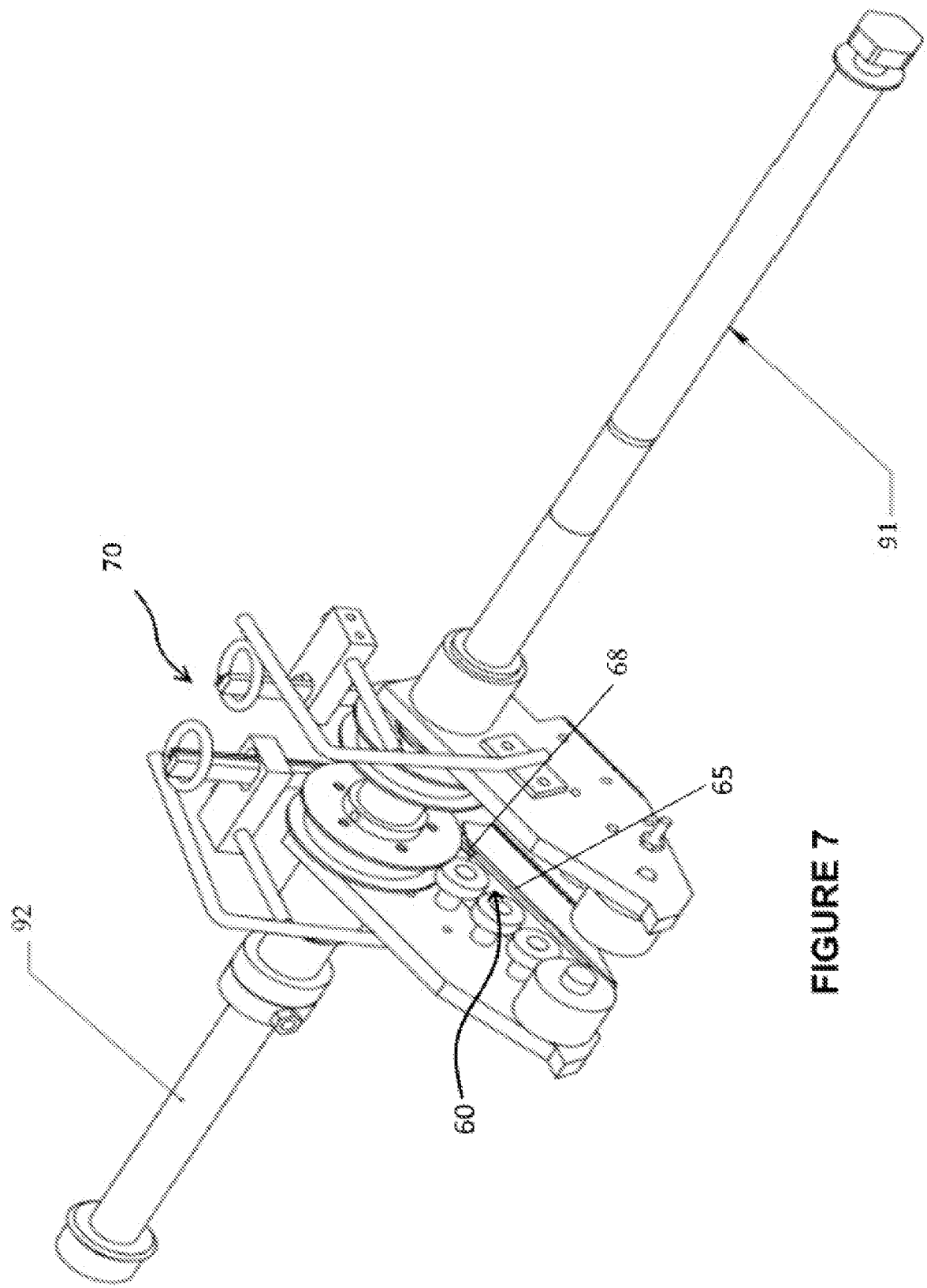
FIG. 7 is a perspective view of the sealing mechanism of FIG. 2 shown being installed using the replacement mechanism of FIG. 5.
Figure 8:
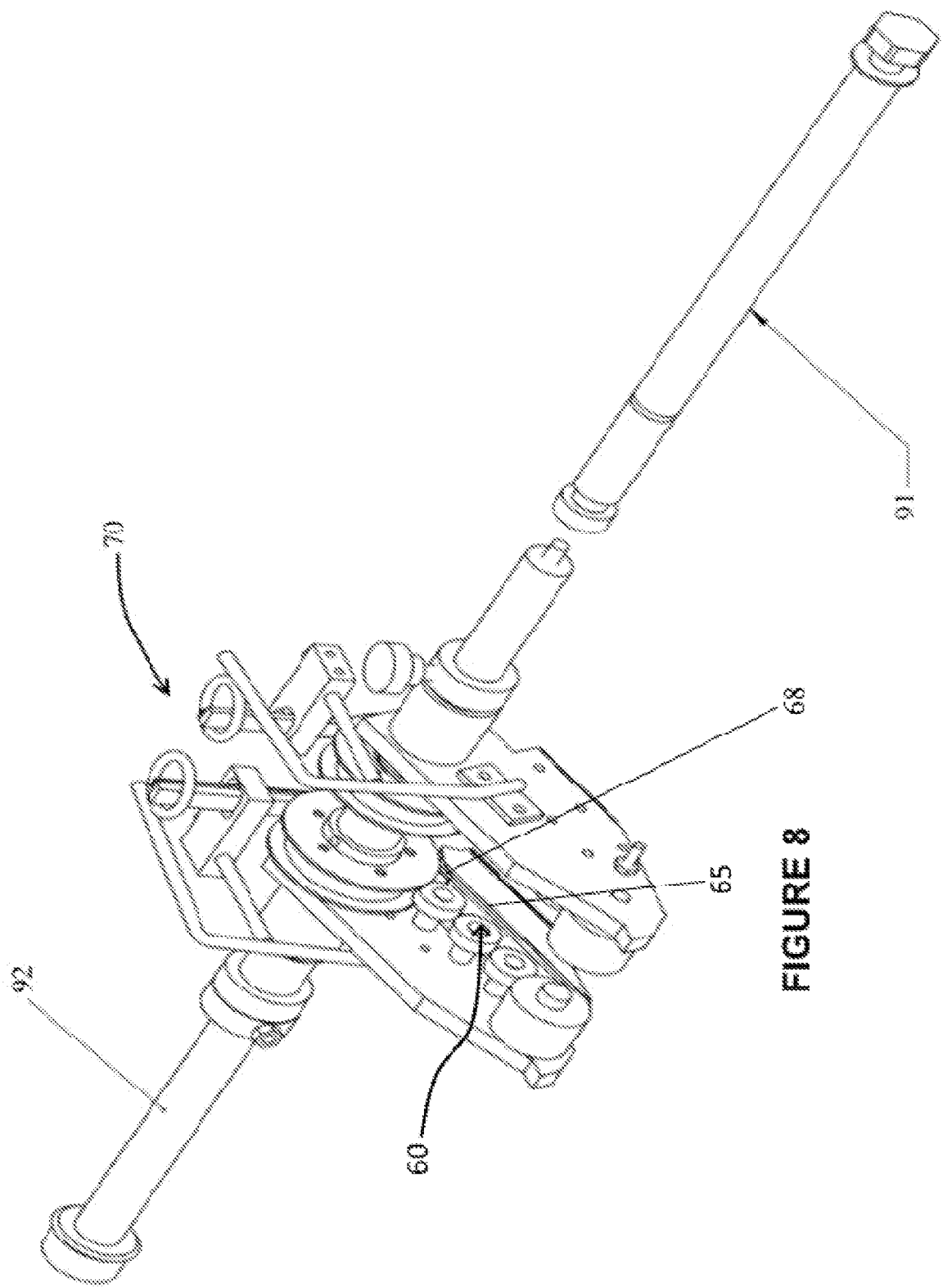
FIG. 8 is a perspective view of the sealing mechanism of FIG. 2 after being installed using the replacement mechanism of FIG. 5.

Referring back to FIGS. 2 and 3, the sealed element 12 is compressed by the drive wheel 71. The sealing mechanism 70 further comprises a member 60 for maintaining compaction of the sealing element. The member 60 comprises a top plate 62 extending from near the drive wheel 71 toward the compacting module 73. The top plate 62 and the pressing wheels 75 maintain compacted shape of a top portion of the sealing element 12. The member 60 further comprises a bottom portion 66 for receiving bottom portion of the compacted sealing element 12. The member 60 further comprises a first side wall 64 protruding from or attached to the support arm 74 and a second side wall 65 may be form by an extension from the bottom portion 66. As shown in FIGS. 7 and 8, the side wall 65 may be formed by a side portion 68 of the top plate 62. The side walls 64 and 65 maintain lateral pressure on the sides of the sealing element 12. The side walls 64, 65, the top portion 62 and the bottom portion 66 form a tunnel 60 maintaining compaction on the sealing element 12 from compression of the drive wheel 71. The top portion of the tunnel 60 may be formed by the top plate 52 and the pressing wheels 75 downstream of the top plate 52.

The drive wheel 71 may further comprises side walls 712, 713 extending from the bottom portion 711 of the drive wheel 71. The side walls 712, 713 are adapted to receive side portions of the sealing element 12 and the bottom portion 711 receives a top portion of the sealing element 12.

The method may further comprise downwardly pivoting the support arms 74 once the sealing process and cutting process are completed.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for installing a resilient sealing element on a linear window support frame, the method comprising:
  moving and compacting the sealing element through a sealing mechanism at a first speed to deform the sealing element to create a first pressure point;
  displacing the support frame relative to the sealing mechanism at a second speed, the second speed being slower than the first speed;
  guiding the moving sealing element and maintaining the moving sealing element under a constant pressure by inserting the compacted sealing element into a tunnel section maintaining a periphery of the sealing element in a compacted state downstream of the moving and compacting of the sealing element;
  applying a pressure on the sealing element against the support frame to create a second pressure point downstream of the guiding and maintaining of the sealing element under a constant pressure to fit the said moving sealing element on the linear window support frame.

2. The method of claim 1, the method further comprising:
  activating movement of the sealing element to synchronize with movement of the support frame;
  deactivating movement of the sealing element when no support frame is present.

3. The method of claim 2, the activating of movement of the sealing element further comprising pivoting an engaging member to enable traction of the sealing element.

4. The method of claim 1, a ratio of the first speed and the second ranging between 1.01 and 1.05.

5. The method of claim 1 further comprising detecting a presence of the support frame.

6. The method of claim 5 further comprising cutting the fitted sealing element when the support frame is detected.

7. The method of claim 1, the compacting of the sealing element comprising radially compressing the sealing element.

8. The method of claim 1, the compacting and moving of the sealing element longitudinally compressing the sealing element fitted on the support frame.

9. The method of claim 1, the application of a pressure on the sealing element against the support frame further comprising fitting of the sealing element on a groove of the support frame receiving the said sealing element.

10. The method of claim 1, the tunnel being formed by a top plate, side walls and a bottom portion.

* * * * *